United States Patent [19]

Iwagaya et al.

[11] Patent Number: 4,943,905
[45] Date of Patent: Jul. 24, 1990

[54] INTERFACING METHOD IN A NUMERICAL CONTROL APPARATUS

[75] Inventors: Takashi Iwagaya, Hachioji; Tomomi Nakazato, Kawasaki, both of Japan

[73] Assignee: Fanuc Ltd., Yamanashi, Japan

[21] Appl. No.: 245,320

[22] PCT Filed: Feb. 19, 1988

[86] PCT No.: PCT/JP88/00178
§ 371 Date: Aug. 11, 1988
§ 102(e) Date: Aug. 11, 1988

[87] PCT Pub. No.: WO88/06309
PCT Pub. Date: Aug. 25, 1988

[30] Foreign Application Priority Data

Feb. 21, 1987 [JP] Japan ................................. 62-36888

[51] Int. Cl.[5] .............................................. G05B 19/18
[52] U.S. Cl. ..................................... 364/136; 364/141; 364/474.01
[58] Field of Search ........ 364/136, 140, 141, 131–135, 364/474.11, 474.01, 200 MS File, 900 MS File

[56] References Cited

U.S. PATENT DOCUMENTS

| 4,029,950 | 6/1977 | Haga | 364/136 |
|---|---|---|---|
| 4,034,354 | 7/1977 | Simmons | 364/136 |
| 4,415,965 | 11/1983 | Imazeki et al. | 364/136 |
| 4,513,379 | 4/1985 | Wilson et al. | 364/136 X |
| 4,550,366 | 10/1985 | Toyama et al. | 364/136 |
| 4,584,638 | 4/1986 | Akasofu | 364/136 |
| 4,628,442 | 12/1986 | Isobe et al. | 364/136 X |

Primary Examiner—Joseph Ruggiero
Attorney, Agent, or Firm—Staas & Halsey

[57] ABSTRACT

An interfacing method in a numerical control apparatus is provided, which is capable of effecting, at a high speed, an interfacing process upon transfer of a signal between microprocessors respectively housed in a numerical control section and in a programmable machine controller. When reading out an M code from a numerical control program, the processor of the numerical control section delivers the M code to a latch circuit of an interface circuit so as to store the same code in the latch circuit, and inverts a logic level of a first status signal (MF) stored in a corresponding bit region of a first register of the interface circuit. Thereafter, when the controller completes a sequence control associated with the M code, the processor of the controller inverts a logic level of a second status signal (MFIN) stored in a corresponding bit region of a second register of the interface circuit. When the first and second status signals are in the same logic level, the processor of the numerical control section starts processing for the next block of the numerical control program. As a consequence, the interfacing process is carried out at a high speed.

3 Claims, 2 Drawing Sheets

INTERFACING METHOD IN A NUMERICAL CONTROL APPARATUS

BACKGROUND OF THE INVENTION

1. Field of the Invention

The present invention relates to an interfacing method in a numerical control apparatus, which is capable of performing an interfacing process at a high speed for signal transfer between microprocessors respectively housed in a numerical control section and in a programmable sequence control section.

2. Description of the Related Art

In a numerical control apparatus of the type having a numerical control section and a programmable control section each of which accommodates therein a microprocessor, various signals are delivered and received, or, transferred, between these processors for execution of various control operations. For example, as shown in FIG. 2, upon completion of reading of a particular command code (an M code, for instance) from an NC program, the processor of the numerical control section, arranged to execute the NC program block by block, delivers a command data to a latch circuit housed in an interface circuit so as to store the same data in this latch circuit. It then sets a predetermined status bit (a status bit MF, for instance) of a register of the interface circuit at a logic level indicative of the command data being stored in the latch circuit. Thereafter, when the sequence control section completes a control operation associated with the command data read out through the interface circuit, the processor of the sequence control section sets a different status bit (a status bit MFIN, for instance) of the interface circuit at a logic level indicative of the control operation being completed. In response to this, the processor of the numerical control section starts execution of the succeeding block only after erasing the command data stored in the latch circuit, if necessary, and resetting the status bit MF. Then, the processor of the sequence control section resets the status bit MFIN. Thus, conventionally, the interfacing process for signal transfer between these processors is time-consuming, resulting in a time period for execution of control being lengthened.

SUMMARY OF THE INVENTION

An object of the present invention is to provide an interfacing method in a numerical control apparatus, which is capable of effecting, at a high speed, an interfacing process for signal transfer between microprocessors respectively housed in a numerical control section and in a programmable control section.

In order to achieve the above-mentioned object, according to the present invention, there is provided an interfacing method wherein signal transfer between a numerical control section for executing a numerical control program block by block and a programmable sequence control section is effected by means of an interface circuit disposed between these sections. This interfacing method comprises the steps of: (a) operating said numerical control section so that a particular command is delivered to said interface circuit and a logic level of a first predetermined status signal stored in a first storage means of said interface circuit is reversed, when said numerical control section reads said particular command from the numerical control program; (b) operating said sequence control section so that a logic level of a second status signal stored in a second storage means of said interface circuit is reversed, when said sequence control section completes sequence control associated with said particular signal; and (c) operating said numerical control section so that a processing associated with the next block of the numerical control program is started, when a predetermined relation is fulfilled between said first and second predetermined status signals.

As mentioned above, according to the present invention, when a particular command is read out by the numerical control section and when a control operation associated with this command effected by the sequence control section is completed, a logic level of a corresponding status signal is reversed, respectively, and the next block of the numerical control program is executed when the predetermined relationship is fulfilled between these status signals. Accordingly, interfacing process upon transfer of a signal between the numerical control section and the sequence control section can be carried out at a high speed, and thus a time period for execution of control can be shortened.

DETAILED DESCRIPTION OF THE PREFERRED EMBODIMENTS

Figure 1:
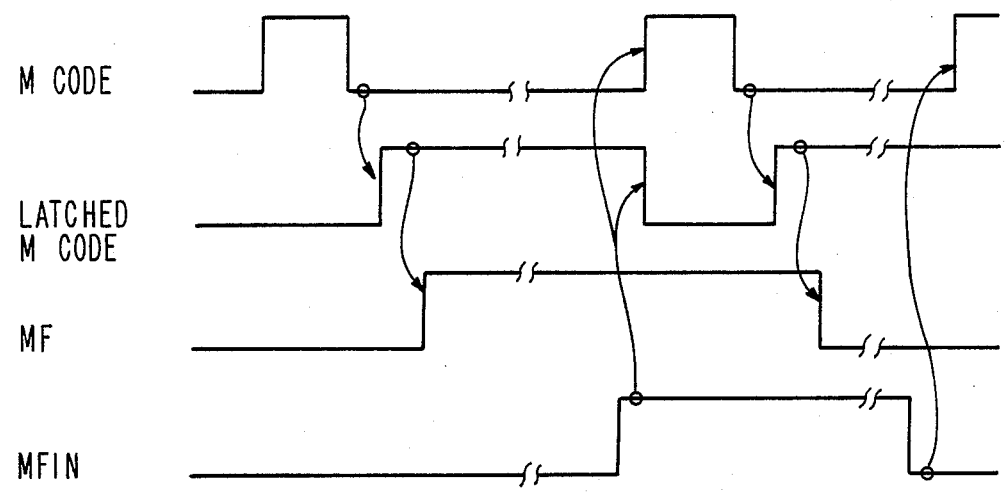
FIG. 1 is a timing chart showing an interfacing method according to an embodiment of the present invention.
Figure 2:
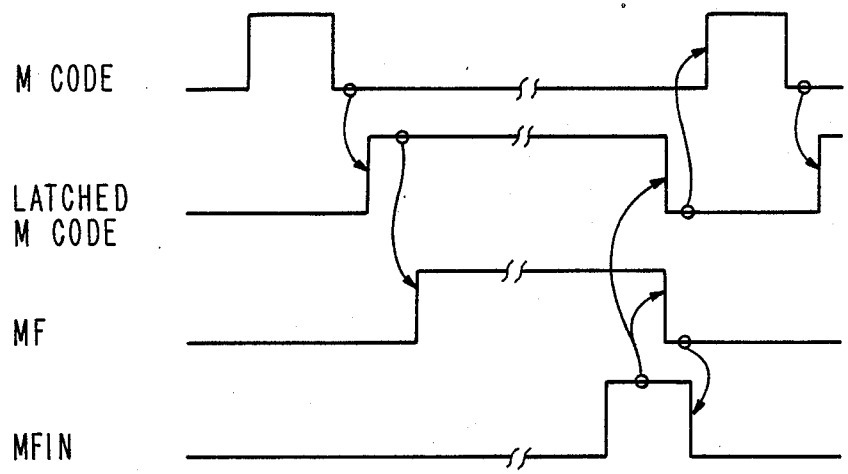
FIG. 2 is a timing chart showing a conventional interfacing method.
Figure 3:
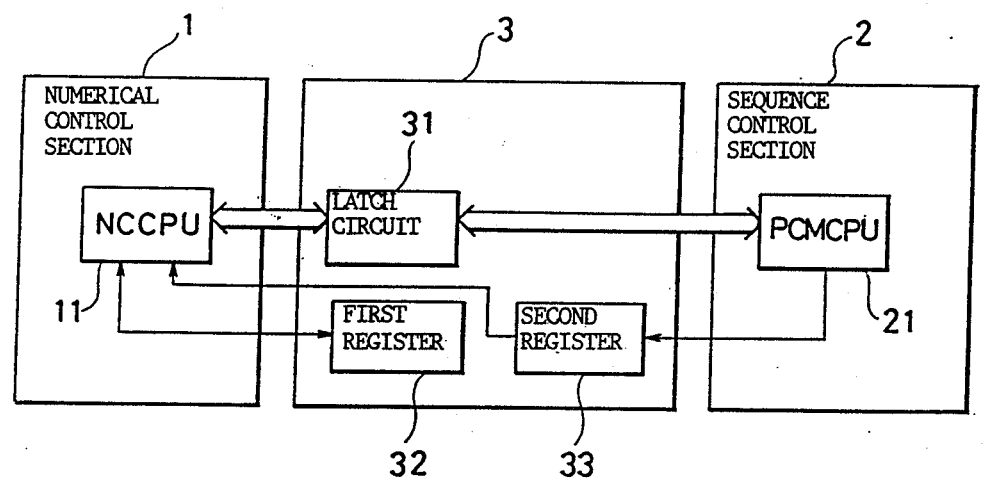
FIG. 3 is a schematic view showing an essential part of a numerical control apparatus to which the interfacing method of the present invention is applied.

With reference to FIG. 1 and 3, an interfacing method according to an embodiment of the present invention will be explained.

A numerical control apparatus to which the interfacing method according to an embodiment of the present invention is applied, is arranged for use with an NC machine tool (not shown), for instance. As shown in FIG. 3, the numerical control apparatus comprises a numerical control section 1 accommodating therein a microprocessor (hereinafter referred to as NCCPU) 11, a programmable machine controller 2, as a sequence control section, accommodating therein a microprocessor (hereinafter referred to as PMCCPU) 21, and an interface circuit 3 disposed between these microprocessors. The NCCPU 11 operates to read an NC program block by block. In case that it reads a particular coded signal such as a command data including any of M code, S code and T code, the NCCPU 11 delivers the command data to the interface circuit 3 immediately after the same data is read out, and causes a first status signal MF, mentioned later, to be inverted. As in a conventional manner, the M code is employed to specify an auxiliary function such as one for turning on/off spindle rotation, the S code to specify spindle rotation rate, and the T code to specify a tool to be used after tool replacement, respectively. The interface circuit 3 comprises latch circuits (only one of them for storing the M code is shown by reference numeral 31 for simplicity of drawing) for storing respective particular commands as a data signal, a first register 32, and a second register 33. The first register 32 is arranged to store first status signals associated with respective codes at corresponding bit regions of the register 32. Each of the first status signals is inverted in logic level each time an associated coded signal is delivered from the NCCPU 11 to the PMCCPU 21. The second register 33 is arranged to store second status signals associated with the respective coded signals at corresponding bit regions of the register 33. Each of the second status signals is inverted in logic level each time a control operation effected by the PMCCPU 21 is completed. Further, the latch circuits 31 and the registers 32, 33 are arranged to be reset to a value of "0" or to a logic level of "0" at their initialized states. Moreover, the PMCCPU 21 is arranged to invert the second status signal associated with its control operation immediately after completion of the same control operation. The NCCPU 11 is connected to the registers 32, 33 for determination of the logic levels of various status signals.

In the following, the operation of the numerical control apparatus constructed as mentioned above will be explained with reference to FIG. 1.

When the NCCPU 11, arranged to read the NC program block by block, completes reading of the particular command data, i.e., any of the M, S and T codes, for instance, it delivers this command data such as the M code to the latch circuit 31 of the interface circuit 3 so as to store the same data in the latch circuit. Further, upon completion of the M code being stored, the NCCPU 11 inverts the logic level of the first status signal MF, which is stored in an associated bit region of the first register 32 and which serves as one of the conditions for determining whether or not the processing for the next block of the numerical control program is permitted to start. Here, an inversion takes place from the logic level of "0" at the initialized state to the logic level of "1".

In this manner, when the logic level of the first status signal MF is inverted, the sequence control section 2 executes a control operation associated with an auxiliary function specified by the M code which is read out by the PMCCPU 21 from the latch circuit 31. Thereafter, upon completion of the control operation, the PMCCPU 21 of the sequence control section 2 inverts the logic level of the second status signal MFIN, which is stored in an associated bit region of the second register 33 and serves as another condition for determining whether the next block of the numerical control program is permitted to start. Here, an inversion is made from the logic level of "0" at the initialized state to the logic level of "1".

As a consequence, the logic level of the first status signal MF and that of the second status signal MFIN are now consistent with each other. In other words, the condition in this embodiment for completing the process for the present block, or the condition for starting the process for the next block is fulfilled, although these logic levels have been inconsistent with each other after the M code is read out, or, during the time the processing associated with the M code is carried out. When the NCCPU 11 determines the fulfillment of the same condition on the basis of the contents stored in the bit regions of the first and second registers 32, 33 associated with the M code, it starts the processing for the next block of the numerical control program, and then erases the M code stored in the latch circuit 31. FIG. 1 shows the case where the M code is stated in the next block. In this case, the same interfacing process as that mentioned above is carried out. It should be noted, however, that the logic level of the first status signal MF is inverted from "1" to "0" when the M code is written into the latch circuit 31, and the logic level of the second status signal MFIN is inverted from "1" to "0" upon completion of the sequence control operation associated with the M code, as distinct from the interfacing process for the preceding block. Even in this case, the completion of the process is similarly determined on the basis of the fact that the logic levels of the status signals are made consistent with each other.

In case that a particular signal other than the M code, such as the S code relating to spindle rotation control or the T code relating to tool selection control is read out, substantially the same interfacing process is executed as in the case where the M code is read out. Accordingly, a detailed operational explanation will be omitted. However, it is noted that the S code or the T code, stored in an associated latch circuit (not shown) which corresponds to the latch circuit 31, is not erased even when the completion of the present block is determined, as distinct from the aforementioned interfacing process associated with the M code.

In this manner, the interfacing process between the numerical control section 1 and the sequence control section is carried out at a high speed, whereby the operation of the machine tool is also carried out at a high speed by the numerical control apparatus.

The interfacing process of the present invention is not limited to the aforementioned embodiment, but various modifications may be made. For example, although the logic levels of both of the first and second status signals are set to "0" at their initialized states in the foregoing embodiment, it may be possible to set either one of the status signals at logic level of "1" while another status signal is set to logic level of "0". In this case, the completion of processing for the present block may be determined when the logic levels of these status signals are inconsistent with each other.

We claim:

1. An interfacing method in a numerical control apparatus, wherein signal transfer between a numerical control section for executing a numerical control program block by block and a programmable sequence control section is effected by means of an interface circuit disposed between these sections, said interfacing method comprising the steps of:
   (a) operating said numerical control section so as to deliver a particular command to said interface circuit and to invert a logic level of a first predetermined status signal stored in a first storage means of said interface circuit, when said numerical control section reads said particular command from the numerical control program;
   (b) operating said sequence control section so as to invert a logic level of a second predetermined status signal stored in a second storage means of said interface circuit, when said sequence control section completes sequence control associated with said particular command; and
   (c) operating said numerical control section so as to start processing associated with a next block of the numerical control program, when a predetermined relation is fulfilled between said first and second predetermined status signals.

2. An interfacing method in a numerical control apparatus according to claim 1, further comprising the step of setting said first and second predetermined status signals at the same logic level when the numerical control apparatus is in its initialized state, the fulfillment of said predetermined relationship being determined when both of said status signals are the same in their logic level in said step (c).

3. An interfacing method in a numerical control apparatus according to claim 1, further comprising the step of setting said first and second predetermined status signals at logic levels different from each other, the fulfillment of said predetermined relationship being determined when both of said status signals are different in logic levels from each other in said step (c).

* * * * *